UNITED STATES PATENT OFFICE.

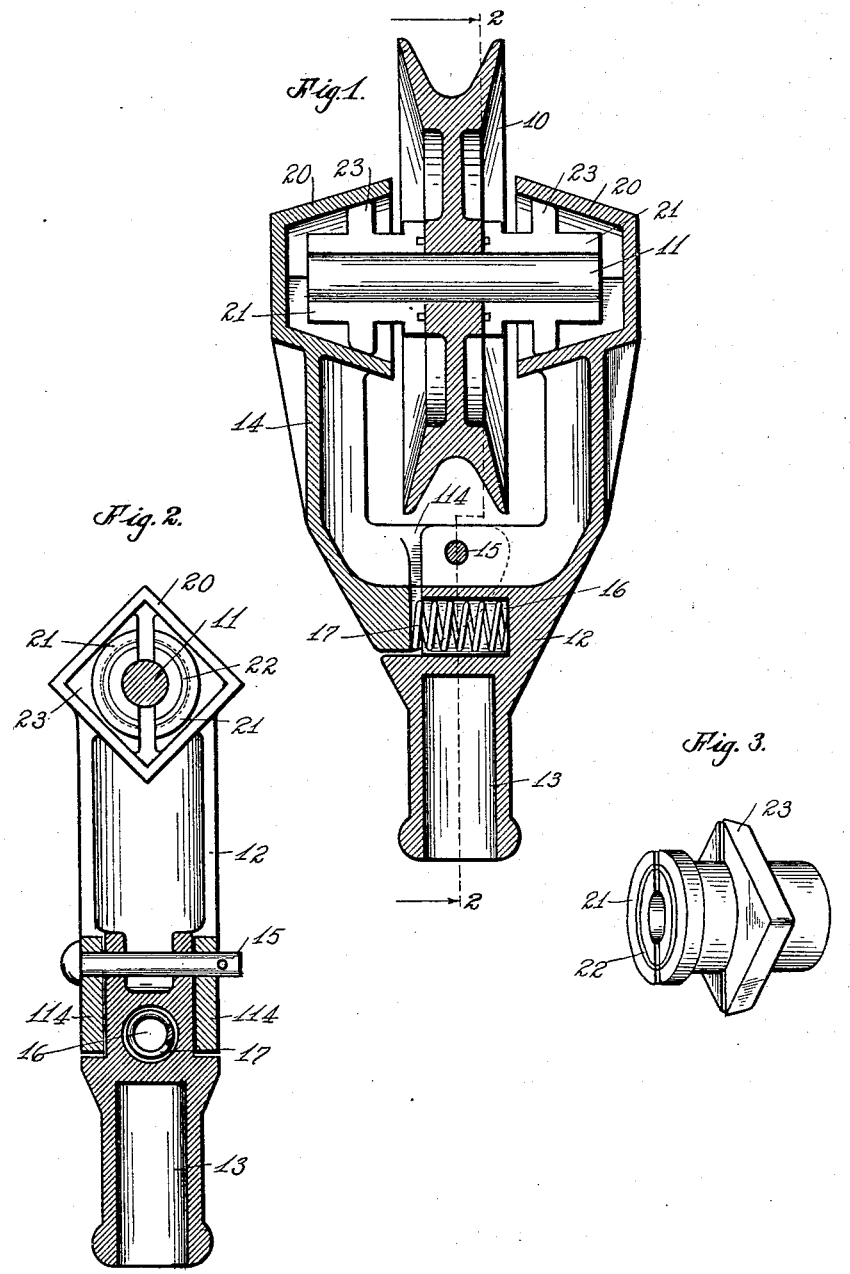

GEORGE E. HENRY, OF VINCENNES, INDIANA.

TROLLEY-MOUNTING.

1,177,517.  Specification of Letters Patent.  Patented Mar. 28, 1916.

Application filed March 4, 1915. Serial No. 12,061.

*To all whom it may concern:*

Be it known that I, GEORGE E. HENRY, a citizen of the United States, and a resident of Vincennes, county of Knox, and State of Indiana, have invented a certain new and useful Trolley-Mounting; and I do hereby declare that the following is a full, clear, and exact description thereof, reference being had to the accompanying drawings, in which like letters refer to like parts.

The objection of this invention is an improvement of trolley wheel mountings so as to prolong the life thereof and enable the same to be operated without the use of oil or grease and without attention. With these improvements trolley wheels substantially double the mileage of those heretofore in use.

The improvements herein are on the construction disclosed in my former Patent No. 1,043,103, dated November 5, 1912.

One improvement consists in mounting the boxes in a diagonal position with relation to the harp in which the trolley is mounted and providing bearings in said boxes which are split vertically so that the wear of the spindle will not be in a point between the halves of the bearing and the wear will be distributed on the bearing so that the bearing will last until it is entirely worn out, being held always in proper place by the rear angle of the box.

Another feature of the invention consists in providing rectangular flanges on the bearings about midway the length thereof and with beveled edges to operate and fit in the tapering boxes of the harp members. This reduces the extent of the bearing surfaces engaging the walls of the boxes and protects the main body of the bearing from any wear whatever, and permits the bearings to adjust themselves to perfect alinement with the spindle and distributes uniformly the pressure over the entire contact surface.

Another feature of the invention is the arrangement thereof whereby perfect conducting contact between the parts will always exist. This results from the coöperation of the spring pressed members of the harp, the boxes tapering outwardly, the bearings having ribs around them engaging sharply the walls of the boxes, and particularly the angular relationship between the bearings in the boxes, the bearings wedging into the rearmost angles of the boxes so that there is always a closed contact between the elements or parts of the structure, whereby unusually good conductivity is maintained.

Another feature of the invention is the construction of the loop of the spring for forcing the outer members thereof toward each other. This spring, being placed below the fulcrum and pressing outwardly not only serves to press the upper extending members inwardly, but keeps a pressure at the connecting point of the harp members, insuring solidity and perfect contact at this point.

The full nature of the invention will be understood from the accompanying drawings and the following description and claims.

In the drawings, Figure 1 is a central vertical section through the trolley wheel and its mounting. Fig. 2 is a section on the line 2—2 of Fig. 1 with the trolley wheel and its spindle omitted. Fig. 3 is a perspective view of one of the bearings.

The trolley wheel 10 and its spindle 11 are of usual form. The harp consists of two members, a main member 12 with a socketed shank 13 for securing it on the upper end of the trolley pole, not shown. The pivoted member 14 of the harp is fulcrumed on a pin 15 which extends through the upper part of the shank of the main member 12 of the harp, as shown in Fig. 2. The member 14 of the harp has at its lower end two ears 114, as shown in Fig. 2, which fit astride the upper part of the shank of the member 12. In said member 12 there is a chamber 16 in which a spiral spring 17 is located which projects out of said chamber against the pivoted member 14. This spring which acts between the two members is located below the fulcrum 15 so that its tendency to push the lower ends of the members apart tends proportionately to force the upper ends of the harp members toward each other. The mounting of the spring is such as to wholly inclose the spring and protect it from water, dirt and frost. The boxes 20 on the upper ends of the two members of the harp taper outwardly and are rectangular in cross sections, as shown in Fig. 2, and are arranged diagonally of the harp members, as shown in Fig. 2, one corner of a box extending toward the fulcrum of the harp and the two opposite corners of the box extending forward and rearward, respectively, and the fourth corner extending upward.

The bearing consists of two halves 21 having a cylindrical port for the spindle and being grooved at the inner end for graphite packing 22 to bear against the sides of the trolley wheel. A flange 23 extends around the bearing 21 and about midway the length thereof consisting of two triangular portions on the halves of the bearings which together make a rectangular flange with the bearing surfaces thereof tapering outward with the same angle of obliquity as the inner bearing surfaces of the boxes 20. Since these flanges extend beyond the body of the bearings, the latter never come in contact with the boxes but are held in place by said flanges.

From the foregoing construction, it is seen that pressure is exerted by the spring 17 on the two harp members which force the two boxes toward the trolley wheel and, therefore, wedge on the flanges of the bearings 21, making a very tight fit between the bearing flanges 23 and the boxes. Then the bearings are forced thereby tightly against the sides of the trolley wheel. As the parts wear, the pressure of the boxes toward the trolley wheel cause the parts to take up the wear and maintain their proper relative positions and continue to do this until worn out, and without any oil, grease or the like to interfere with them and without any attention from the workmen.

The diagonal arrangement of the boxes and bearings with relation to the harp members, as indicated in Fig. 2, has two functions. It prolongs the life of the device because the directness of the pressure of the spindle 11 of the trolley wheel, under the compound influence of the direction of travel of the car and the inclined position of the trolley wheel and the upward pressure of the trolley wheel against the trolley wire, causes the pressure of the spindle 11 to be in almost a horizontal direction toward the rear corner of the boxes when mounted as shown and when the trolley poles assume the average inclination. This pressure of the spindle in said direction causes it to press centrally against the rear half of the bearing and as said bearing flanges wear, said rear half of the bearing will be always centered by the pressure against such bearing of the spindle of the wheel toward the angle in the box. Also this feature of the mounting of the bearing and arrangement of the boxes and of the rearward half of the bearing and the flange 23 and the tapering form of the flange and box and the forcing of the boxes toward each other and the absence of grease, oil or the like, makes the contact between the parts very sharp and close so that the conductivity of such parts is practically one hundred per cent. at all times and without any adjustment. The two half members of the bearing 21 are each less than a semi-circular cross section so that when assembled on the spindle 11 there will be a considerable space between the adjacent faces of the bearing members so that the bearing members will not come together until the bearing is practically worn out. The purpose of this is to cause the bearing members to closely hug and fit tightly on the spindle 11 by reason of the tapering form of the boxes 20 which are pressed toward each other and of the flange 23 of the bearing members. The spring in the harp, therefore, not only presses the bearing members against the hub of the trolley wheel, but also presses each tightly on the spindle. This also assists in obtaining a perfect conductor for the current from the wheel to the harp.

The invention claimed is:

1. A trolley wheel mounting including a harp having lateral members spring pressed toward each other, said members having boxes tapering outward, bearings in said boxes with flanges thereon having inclined faces to fit and operate in said boxes and protect the bearings from the boxes, and a trolley wheel and spindle mounted in said bearings and between said boxes so that the boxes will be forced against the hub of the trolley wheel and spindle and the wear of all parts will be automatically taken up.

2. A trolley wheel mounting including a harp having lateral members spring pressed toward each other, said members having boxes tapering outward, a bearing in each box split centrally and longitudinally into two halves, each half having a triangular flange about midway the length thereof so that the flanges of the two halves will make a rectangular flange, said flanges having beveled outer surfaces for flatly engaging the tapering surfaces of the boxes, and a trolley wheel and spindle mounted in said bearings and between said boxes so that the boxes will be forced against the hub of the trolley wheel and the wear of all parts will be automatically taken up.

3. A trolley wheel mounting including a harp having lateral members spring pressed toward each other, said members having boxes tapering outward, a bearing having a main cylindrical portion and a rectangular flange about midway thereof with the outer surface beveled to fit flat against the surfaces of the tapering box, said bearing being longitudinally split into two halves, the line of said separation cutting the rectangular flange diagonally through the same, and a trolley wheel and spindle mounted in said bearings and between said boxes so that the boxes will be forced against the hub of the trolley wheel and the wear of all parts will be automatically taken up.

4. A trolley wheel mounting including a harp having lateral members spring pressed toward each other, said members having boxes tapering outwardly and arranged diagonally with reference to the members of the harp so that the plane longitudinally through the harp will cut the boxes diagonally, bearings in said boxes with the portions thereof engaging the boxes being rectangular and beveled to fit the tapering surfaces of the boxes, and a trolley wheel and spindle mounted in said bearings and between said boxes so that the boxes will be forced against the hub of the trolley wheel and the wear of all parts will be automatically taken up.

5. A trolley wheel mounting including a harp having lateral members spring pressed toward each other, said members having boxes tapering outwardly and arranged diagonally with reference to the members of the harp so that the plane longitudinally through the harp will cut the boxes diagonally, bearings in said boxes with the portions thereof engaging the boxes being rectangular and beveled to fit the tapering surfaces of the boxes, and a trolley wheel and spindle mounted in said bearings and between said boxes so that the boxes will be forced against the hub of the trolley wheel and the wear of all parts will be automatically taken up, each of said boxes being divided into two halves on a plane longitudinally and centrally through the harp.

6. A trolley wheel mounting including a harp having two members, one of said members being a main member with a shank adapted to be secured to the trolley pole, the other member being fulcrumed to said main member, and a spring below the fulcrum tending to force the lower portions of said harp members outwardly and thereby to force the upper ends of the harp members toward each other.

7. A trolley wheel mounting including a harp having two members, one of said members being a main member with a shank adapted to be secured to the trolley pole and having a transverse recess therein, means for fulcruming the other harp member to said main harp member above said recess, and a spiral spring in said recess tending to force the portions of the harp member below said fulcrum apart and to force the upper ends thereof toward each other.

8. A trolley wheel mounting including a trolley wheel, a spindle therefor, sectional bearings in which said spindle is mounted and having surrounding surfaces tapering outward, said bearings having boxes that taper outwardly, and a harp having lateral members spring-pressed toward each other for carrying the boxes, whereby the bearings will be caused to hug the spindle.

9. A trolley wheel mounting including a trolley wheel, a spindle therefor, sectional bearings normally with a bore less than the diameter of the spindle and having surrounding surfaces tapering outward, said bearings having boxes that taper outwardly, and a harp having lateral members spring-pressed toward each other for carrying the boxes, whereby the bearings will be caused to hug the spindle.

10. A mounting for a trolley wheel with a spindle, comprising a pair of split bearing blocks adapted to engage the wheel and its spindle on their vertical and lateral bearing surfaces respectively, and a trolley harp provided with means for resiliently holding said bearing blocks on said bearing surfaces.

11. A trolley wheel mounting comprising the combination with the wheel and its spindle, of a pair of sectional bearing blocks adapted to engage both the spindle and the wheel hub, and a trolley harp adapted to support said bearing blocks and having resilient means to press the blocks against the hub and to close the sections thereof against the spindle.

12. A mounting for a trolley wheel having a fixed spindle, comprising a series of bearing blocks incompletely surrounding the spindle, and a trolley harp having resiliently mounted boxes engaging said series of bearing blocks and constantly pressing them both inward toward the wheel and inward against the wheel spindle.

13. A mounting for a trolley wheel having a spindle, comprising a head or harp made of two members pivoted and resiliently held together, each member having an inwardly flaring bearing box, and a sectional bearing mounted in each box and resiliently held against the trolley wheel and spindle by the engagement with said flaring boxes, substantially as described.

In witness whereof, I have hereunto affixed my signature in the presence of the witnesses herein named.

GEORGE E. HENRY.

Witnesses:
ERNEST G. MEYER,
FRANK R. GOLDMAN.